United States Patent
Schnitzler et al.

(10) Patent No.: US 11,664,636 B2
(45) Date of Patent: May 30, 2023

(54) LASER AMPLIFICATION METHOD

(71) Applicant: Amphos GmbH, Herzogenrath (DE)

(72) Inventors: Claus Schnitzler, Kreuzau (DE); Jan Dolkemeyer, Herzogenrath (DE); Torsten Mans, Herzogenrath (DE)

(73) Assignee: Amphos GmbH, Herzogenrath (DE)

( * ) Notice: Subject to any disclaimer, the term of this patent is extended or adjusted under 35 U.S.C. 154(b) by 76 days.

(21) Appl. No.: 16/870,736

(22) Filed: May 8, 2020

(65) Prior Publication Data

US 2020/0274312 A1 Aug. 27, 2020

Related U.S. Application Data

(63) Continuation of application No. PCT/DE2018/100903, filed on Nov. 7, 2018.

(30) Foreign Application Priority Data

Nov. 10, 2017 (DE) .......................... 102017126453.1

(51) Int. Cl.
*H01S 3/00* (2006.01)
*H01S 3/06* (2006.01)
*H01S 3/0941* (2006.01)
*H01S 3/10* (2006.01)
*H01S 3/23* (2006.01)

(52) U.S. Cl.
CPC .......... *H01S 3/0606* (2013.01); *H01S 3/0064* (2013.01); *H01S 3/0941* (2013.01); *H01S 3/10023* (2013.01); *H01S 3/10061* (2013.01); *H01S 3/2316* (2013.01); *H01S 3/2341* (2013.01)

(58) Field of Classification Search
CPC .......................... H01S 3/10023; H01S 3/2316
See application file for complete search history.

(56) References Cited

U.S. PATENT DOCUMENTS

| | | | | |
|---|---|---|---|---|
| 4,698,816 A | * | 10/1987 | Chun ..................... | G02B 26/06 372/19 |
| 2006/0239304 A1 | * | 10/2006 | Yin ..................... | H01S 3/13017 372/19 |
| 2008/0043788 A1 | | 2/2008 | Suzudo et al. | |
| 2016/0316551 A1 | * | 10/2016 | Kurosawa ............. | H01S 3/2232 |

FOREIGN PATENT DOCUMENTS

| | | |
|---|---|---|
| DE | 10025874 B4 | 3/2005 |
| EP | 2965852 A1 | 1/2016 |
| JP | 200736080 A | 1/1991 |

(Continued)

OTHER PUBLICATIONS

Armstrong & Smith, "Using a Newport refractive beam shaper to generate high-quality flat-top spatial profiles from a flashlamp-pumped commercial Nd:YAG laser," Laser Beam Shaping, 2004, 5525:88-97.

(Continued)

*Primary Examiner* — Mark Hellner
(74) *Attorney, Agent, or Firm* — Fish & Richardson P.C.

(57) ABSTRACT

A method and system for amplifying seed laser radiation which is irradiated along an irradiation direction into a lasing amplification medium has a transverse seed laser intensity profile that is transformed into a plateaued input intensity profile by a transformer element on the irradiation side.

16 Claims, 2 Drawing Sheets

(56) References Cited

FOREIGN PATENT DOCUMENTS

| JP | H07235717 A | 9/1995 | |
|---|---|---|---|
| JP | 2008010603 A | 1/2008 | |
| JP | 2009016541 A * | 1/2009 | ........... H01L 21/268 |
| WO | WO 8601346 A1 * | 2/1986 | ............. H01S 3/115 |
| WO | WO 2019/091514 | 5/2019 | |

OTHER PUBLICATIONS

Laskin & Laskin, "TShaper—Refractive Beam Shaping Optics for Advanced Laser Technologies," Journal of Physics—Conference Series, Feb. 2011, 276(1):012171.

Laskin et al., "Refractive beam shapers for optical systems of lasers," SPIE, Feb. 2015, 9346:93460R, 10 pages.

PCT International Preliminary Report on Patentability in International Appln. No. PCT/DE2018/100903, dated May 12, 2020, 8 pages (with English translation).

PCT International Search Report and Written Opinion in International Appln. No. PCT/DE2018/100903, dated Feb. 5, 2019, 18 pages (with English tranlsation).

KR Office Action in Korean Appln. No. 10-2020-7015655, dated Jul. 27, 2022, 14 pages (with English translation).

* cited by examiner

LASER AMPLIFICATION METHOD

CROSS REFERENCE TO RELATED APPLICATIONS

This application is a continuation of and claims priority under 35 U.S.C. § 120 from PCT Application No. PCT/DE2018/100903, filed on Nov. 7, 2018, which claims priority from German Application No. 10 2017 126 453.1, filed on Nov. 10, 2017. The entire contents of each of these priority applications are incorporated herein by reference.

TECHNICAL FIELD

The present disclosure relates to amplifying seed laser radiation that is radiated into a laser-active amplifier medium along an irradiation direction.

BACKGROUND

Present-day lasers can generate laser radiation in a wide power range. However, particularly lasers that generate laser radiation with relatively high beam quality can be limited in their maximum achievable power by effects such as a thermal lens effect. However, applications such as laser annealing, for example, in which components are heated over a large area using defined laser radiation, require precisely such lasers with high power.

In order nevertheless to generate laser radiation with high beam quality and high power, optical amplifiers disposed downstream of the laser are used. They include at least one laser-active amplifier medium that can amplify the laser radiation using energy fed in previously. The energy can be fed to the laser-active amplifier medium in various ways by so-called pumping, such as, for example, using microwave radiation or a pump laser. The maximum power that is able to be applied during this pumping of the laser-active amplifier medium can be limited by the occurrence of thermal effects which adversely influence the beam quality and can ultimately result in destruction of the amplifier medium in the event of the disruption threshold being exceeded.

For amplification purposes, the relatively low-power laser radiation generated by the laser is radiated as seed laser radiation along an irradiation direction into the laser-active amplifier medium. During propagation through the laser-active amplifier medium, part of the energy pumped into the laser-active amplifier medium is used for amplifying the seed laser radiation. The laser radiation leaves the amplifier medium with a higher power amplified relative to the seed laser radiation.

In order to use more of the pumped energy for amplifying the seed laser radiation and to achieve an improved gain, hitherto the seed laser radiation has passed multiply through the laser-active amplifier medium, as described for example in DE 100 25 874 B4 and EP 1 181 754 B1. For this purpose, seed laser radiation is radiated into the amplifier medium at an angle. The seed laser radiation beam radiated in, having a typical width in the region of 200 µm, is considerably smaller than the amplifier medium, typically having a width of 10 mm or more. After traversing the amplifier medium for the first time, the amplified seed laser radiation is reflected back into the amplifier medium by a reflector element. The seed laser radiation emerging from the amplifier medium and the reflected seed laser radiation have an angular offset with respect to one another, such that the reflected seed laser radiation passes through a different region of the amplifier medium. After traversing the amplifier medium again, the radiation is reflected into the amplifier medium once again by a further reflector element. This continues until the amplified seed laser radiation can leave the amplifier at a point provided. The amplified seed laser radiation beam then has a typical width of 2 mm to 3 mm.

However, these amplification methods may be be disadvantageous in as much as they typically involve a complex set-up and, owing to the use of reflector elements and the comparatively large dimensions needed for the laser-active amplifier medium, moreover they can be structurally complex, expensive and susceptible to faults.

SUMMARY

The object of the present disclosure, therefore, is to specify a method and an amplifier for simpler and efficient amplification of the seed laser radiation already upon a single pass through the amplifier medium.

In the case of a method of the type mentioned in the introduction, this object can be achieved by virtue of the fact that the seed laser radiation has a transverse seed laser intensity profile that is transformed into a plateau-shaped input intensity profile by a transformer element on the irradiation side.

Using the transformer element arranged upstream of the amplifier medium on the irradiation side, the seed laser radiation can be adapted to the dimensions of the laser-active amplifier medium. In this case, the transverse seed laser intensity profile gives rise to the dimensions of the seed laser radiation transversely with respect to the longitudinal irradiation direction. In this case, only that part of the energy which is stored in regions of the laser-active amplifier medium that are traversed by the seed laser radiation amplifies the seed laser radiation. Consequently, only those regions of the amplifier medium which are situated within the transverse intensity profile of the seed laser radiation in the irradiation direction contribute to the amplification. These regions are also referred to as overlap between the seed laser radiation and the amplifier medium. The overlap between the seed laser radiation and the amplifier medium can be enlarged by the transformation. A plateau-shaped input intensity profile—adapted in this way—of the transformed seed laser radiation can transverse the entire regions of the laser-active amplifier medium in a first pass. In this case, plateau-shaped means that the intensity profile at least along one direction has an intensity range with a substantially uniform intensity. The energy stored in the entire laser-active amplifier medium can substantially be used for amplifying the seed laser radiation. This amplification can already take place upon the first pass through the amplifier medium. The amount of amplifier medium for the same amplification can be reduced in a cost-saving manner. The extraction efficiency, the ratio of the laser power gained by the amplification and the power applied for pumping the laser-active amplifier medium can be increased by the transformation. Extraction efficiencies in the range of 30% to 60%, preferably of 35% to 50%, and in particular of 40%, can be achieved. Thermal effects caused by the pumping can be reduced for the same amplification and/or the same output power of the laser radiation from the amplifier medium. The amplification can be implemented more energy-efficiency. Reflector elements for directing the seed laser radiation back into the amplifier medium and a complex set-up that is susceptible to faults can be dispensed with.

One development of the method provides for the input intensity profile to be adapted to a gain function profile of the amplifier medium that extends transversely with respect to the irradiation direction. The gain function profile specifies to what extent the seed laser radiation is amplified depending on its point of incidence on the amplifier medium. By adapting the input intensity profile to the gain function profile, it is possible to further improve the amplification that takes place substantially in the manner of a superimposition of input intensity profile and gain function profile. Different intensities of the input intensity profile can be amplified in the same ratio. The shape of the input intensity profile can also be maintained after the amplification. The input intensity profile can be adapted in one or more directions, in particular in both transverse directions transversely with respect to the irradiation direction. Diffraction effects that occur in a wavelength-dependent manner in the edge region of the amplifier medium, in which the gain function profile is small or zero, can be avoided. The transformed seed laser radiation can be small or substantially zero in the edge regions. On account of the adaptation, diode laser stacks, in particular diode laser bars, can be used for cost-effectively pumping the laser-active amplifier medium. The beam quality of the laser radiation emitted by diode laser stacks can differ significantly with regard to its transverse fast and slow axes; by way of example, the beam quality factor can be from $M^2<10$ to $M^2<2$ for the fast axis and $M^2>1000$ for the slow axis. Different gain function profiles transversely with respect to the irradiation direction can follow from the different beam quality. Using the adaptation, the transformed seed laser radiation can be adapted to this different beam quality.

It is advantageous if the seed laser intensity profile is in the shape of a bell curve, in particular Gaussian. That can be used as a result for different laser sources as seed lasers, in particular including point laser sources. Additional shaping and/or transformation of the laser beam of the laser source can be omitted.

Particularly preferably, the transformed seed laser radiation has an oscillation mode that does not correspond to the fundamental mode of the seed laser radiation. Using an oscillation mode that does not correspond to the fundamental mode, the shape of the input intensity profile of the transformed seed laser radiation can be adapted in a simple manner. Preferably, the transformed seed laser radiation has a transverse oscillation mode that does not correspond to the fundamental mode of the seed laser radiation, in particular a plurality of the transverse oscillation modes. The number of maxima of the oscillation mode can deviate from the number of maxima of the fundamental mode along both transverse directions, preferably along one transverse direction.

A further configuration provides for the maximum intensity of the input intensity profile to be less than the maximum intensity of the seed laser intensity profile. The smaller maximum intensity of the input intensity profile makes it possible to reduce the power density of the radiation that is radiated into the amplifier medium. For the same total power, the power density can be reduced by widening the intensity profile. On account of the lower power density, thermal effects can be avoided and the amplifier medium can be operated below the destruction threshold. The maximum intensity of the input intensity profile can be less than the maximum intensity of the seed laser intensity profile by a factor of 2 to 5.

It is furthermore advantageous if the input intensity profile is embodied substantially in a rectangular fashion, in particular as a super-Gaussian profile or a top-hat profile. A rectangular input intensity profile can be adapted to the laser-active amplifier medium in a simple manner. A super-Gaussian profile, i.e. a higher-order Gaussian profile, or a top-hat profile can provide ranges having a substantially constant intensity corresponding to the maximum intensity of the input intensity profile. The amplifier medium can be loaded uniformly by these ranges of the input intensity profile.

Furthermore, it can be advantageous if the input intensity profile has a continuous edge progression, in particular in the manner of edges of a Gaussian curve. A continuous edge progression can reduce the effects of diffraction effects occurring in the edge regions since only ranges of low intensity of the input intensity profile are affected thereby. Input intensity profiles having a continuous edge progression can be transformed into a high-quality Gaussian-like intensity profile after amplification for further applications.

Provision can be made for the input intensity profile to maintain the shape of the seed laser intensity profile along a transverse direction of the seed laser radiation, in particular along the fast axis. The seed laser intensity profile can be transformed along the transverse direction in a simple manner by adaptation of the intensity. Particularly along the fast axis, along which the seed laser radiation has the highest beam quality, the shape of the seed laser intensity profile can advantageously be maintained. The transformed seed laser radiation can maintain this beam quality.

Preferably, the amplifier medium for amplifying the seed laser radiation is cuboidal. A cuboidal amplifier medium can be installed in a space-saving manner in a structurally simple way. Yb:YAG, Nd:YAG, Nd:YVO, Yb:LuO or further laser-active materials, such as doped crystals and glasses, can be used as laser-active amplifier medium. The amplifier medium can have a longitudinal length of 5 mm to 15 mm, a transverse width of 5 mm to 60 mm and a transverse thickness of 0.5 mm to 1.5 mm. Preferably, the amplifier medium includes a pump channel. Energy for amplifying the seed laser radiation can be pumped into the laser-active amplifier medium situated in the pump channel.

In one development of the method, the seed laser radiation is radiated into the amplifier medium substantially parallel to a surface normal to a side surface of the amplifier medium, in particular parallel to an optical axis of the amplifier. Asymmetries such as occur in the event of transverse irradiation at an angle are avoided by the irradiation taking place substantially parallel to a surface normal. The beam path through the laser-optic amplifier medium can be made simpler. Reflection back can be omitted. A short beam path in comparison with a zigzag movement can be achieved. An amplifier medium with a short beam path can be less susceptible to external influences, thermal effects, stress fractures and thermal lenses. A degradation of the beam parameters and destructions of the laser-active amplifier medium can be avoided.

It is furthermore proposed that the transformed seed laser radiation passes multiply through the amplifier medium, in particular along the same beam path through the amplifier medium. The transformed seed laser radiation can be reflected back into the amplifier medium along the same beam path by a reflector element. A beam path folded in a simple manner can result, along which the transformed seed laser radiation traverses the amplifier medium, in particular up to four times. The transformed seed laser radiation can be amplified further during each pass through the amplifier medium. Alternatively, the transformed seed laser radiation can be reflected back into the amplifier medium along a second beam path, which can be parallel or angularly offset with respect to the first beam path, by a reflector element.

Preferably, optical elements, in particular lenses, aspheres, acylindrical lenses, diffractive elements, mirrors, total internal reflection mixing elements and/or apertures, are used in the transformer element. Optical elements enable a simple transformation of the seed laser radiation. An aperture can trim the, in particular Gaussian, seed laser intensity profile in a simple manner and transform it into an input intensity profile. The power loss caused by the aperture can be compensated for by the improved amplification on account of the adaptation to the amplifier medium. Lenses, aspheres, acylindrical lenses, diffractive elements and/or mirrors can transform the seed laser intensity profile into an input intensity profile substantially without losses. The phase information of the seed laser radiation can be retained by these transformer elements for a further transformation. Total internal reflection mixing elements, such as waveguides or glass plates, can transform the seed laser radiation into a homogenized input intensity profile. The homogenized input intensity profile can then be amplified. Laser radiation optimized for laser annealing can be provided, in the case of which retaining the phase information is irrelevant. A later homogenization of the amplified seed laser radiation or of a portion converted into UV radiation, which homogenization is associated with a considerable cost expenditure, can substantially be omitted.

Advantageously, optical elements disposed downstream of the amplifier medium in the beam path are adapted to the input intensity profile. A simplification of the imaging between the optical elements and the amplifier medium can be achieved. The optical elements disposed downstream of the amplifier medium in the beam path can be for example optical isolators counteracting the entrance of backscattering into the amplifier medium, nonlinear crystals for frequency conversion, retardation plates or Pockels cells for polarization rotation and/or for optical switching. Preferably, the optical elements disposed downstream can have the same, in particular plate-shaped, geometry as the amplifier medium.

It is proposed that using an inverse transformer element, in particular in the manner of a transformer element, the output intensity profile of the amplified seed laser radiation is inverse-transformed, in particular into an intensity profile that is like the seed laser intensity profile. Using the inverse transformation, the intensity profile of the amplified seed laser radiation can be adapted in an application-dependent manner. Using inverse-transformed seed laser radiation, it is possible to maintain the shape of the seed laser intensity profile after amplification. An amplified seed laser intensity profile can be obtained without disproportionately amplifying ranges, in particular of relatively low intensity. If the phase information of the seed laser radiation is retained during transformation and amplification, the beam quality of the seed laser radiation can be reestablished after the inverse transformation. Further mixing of the amplified seed laser intensity profile with other intensity profiles can be carried out in an application-dependent manner.

It is furthermore advantageous if the amplifier medium is pumped by a pump laser beam, the intensity profile of which corresponds to the input intensity profile. The amplifier medium can be pumped by the pump laser beam in such a way that a gain profile corresponding to the input intensity profile can result. Diode laser bars comprising a plurality of laser diodes arranged next to one another linearly are preferably used. The arrangement thereof can be chosen such that a pump laser beam corresponding to the input intensity profile results.

One development of the invention provides for a plurality of amplifier media to be disposed one behind another along the beam path in the manner of cascaded amplifier stages. The amplification of the seed laser radiation by the amplifier can be increased by the cascaded amplifier stages. For adaptation to the divergence of the laser radiation, the individual amplifier media can differ in their dimensions, in particular in their transverse thicknesses. A further transformation, for example an inverse transformation, of the amplified seed laser radiation can be carried out downstream of the cascaded amplifier stages.

Preferably, a transverse width of the amplifier medium is chosen in a power-dependent manner. The amplifier medium can be adapted in a simple manner to the power of the laser radiation that is radiated into the amplifier medium, in particular to the power of the seed laser radiation. Preferably, a transversely wider amplifier medium is chosen for a higher power of the seed laser radiation. In this way, the power density of the transformed seed laser radiation adapted to the amplifier medium can be kept substantially the same. Thermal effects and damage of the amplifier medium as a result of an excessively high power density can be counteracted in a simple manner. In the case of cascaded amplifier stages, the transverse width of the amplifier medium can be chosen according to the output power of the previous amplifier stage. In particular, the transverse width of the amplifier medium can be in the range of 0.5 mm to 1.5 mm for laser radiation having a power in the range of 5 W to 10 W, in the range of 4 mm to 6 mm for a power in the range of 25 W to 50 W, in the range of 9 mm to 11 mm for a power in the range of 50 W to 100 W, and in the range of 14 mm to 16 mm for a power in the range of 75 W to 150 W.

In the case of an amplifier of the type mentioned in the introduction, in order to achieve the above object, it is proposed that the seed laser radiation (4) has a transverse seed laser intensity profile that is transformable into a plateau-shaped input intensity profile by a transformer element on the irradiation side.

The features described in association with the method according to the invention can be applied to the amplifier, too, individually or in combination. The same advantages that have already been described are afforded.

DESCRIPTION OF DRAWINGS

Further details and advantages will be explained by way of example below on the basis of an exemplary embodiments illustrated schematically in the figures, in which.

DETAILED DESCRIPTION

Figure 1:
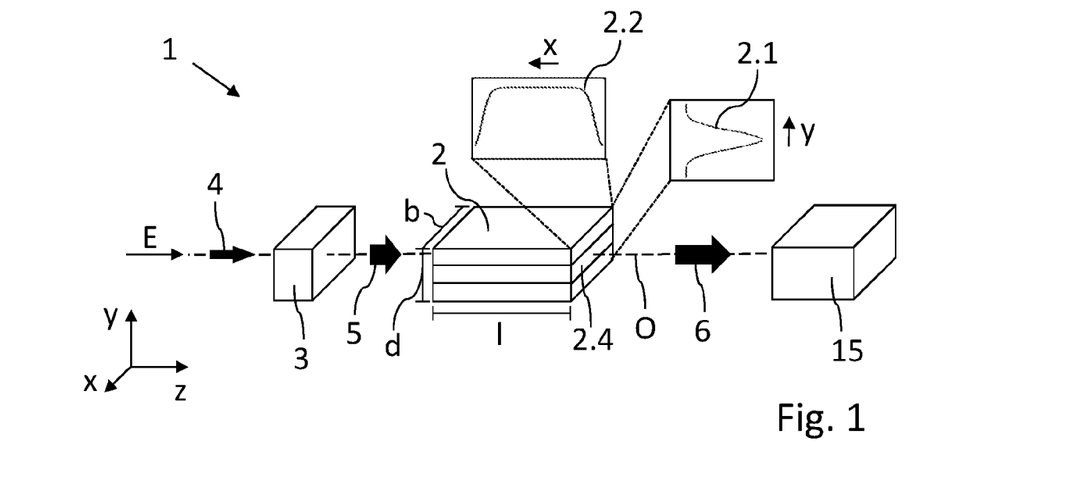
FIG. 1 schematically shows the set-up of the amplifier.

FIG. 1 schematically illustrates the set-up of an amplifier 1. The seed laser radiation 4 to be amplified is radiated into the amplifier 1 including the laser-active amplifier medium 2 along the irradiation direction E. The xyz coordinate system illustrated is maintained in all the illustrations, wherein the longitudinal direction Z runs along the irradiation direction E and the two transverse directions x, y are at right angles to the longitudinal direction z. The direction y runs along the fast axis of the amplifier 1 and the direction x runs along the slow axis of the amplifier 1.

The amplifier 1 includes a transformer element 3 on the irradiation side, which transformer element transforms the seed laser radiation 4 in such a way that a seed laser intensity profile 4.1, 4.2 of the seed laser radiation 4 is transformed into a plateau-shaped input intensity profile 5.1, 5.2. For this purpose, the transformer element 3 includes at least one optical element, preferably a plurality of optical elements. The optical elements can be, in particular, lenses, aspheres, acylindrical lenses, diffractive elements, mirrors, total internal reflection mixing elements and/or apertures for transforming the seed laser radiation 4. Depending on the field of application of the amplifier 1 and of the used optical elements of the transformer element 3, the phase information of the seed laser radiation 4 can be maintained or lost during the transformation.

The transformed seed laser radiation 5, once it has left the transformer element 3, propagates further along the optical axis O of the amplifier 1. Following the transformer element 3 along the optical axis A, the laser-active amplifier medium 2 is arranged in the amplifier 1. This amplifier medium 2 serves for amplifying the transformed seed laser radiation 5. It includes Yb:YAG, Nb:YAG, Nd:YVO, Yb:LuO or other laser-active materials, such as doped crystals and glasses. The amplifier medium 2 has a cuboidal geometry, but can also be rod-shaped or disk-shaped. On account of the cuboidal geometry, the amplifier medium 2 can be arranged in the amplifier 1 in a particularly space-saving manner. Moreover, the predefined cuboidal geometry of the amplifier medium 2 facilitates exchange of the amplifier medium 2 for replacing a damaged amplifier medium 2 or for using an amplifier medium consisting of a different crystal.

The transformed seed laser radiation 5 is radiated into the amplifier medium 2 substantially parallel to a surface normal to the amplifier medium 2 parallel to the optical axis O. Reflections at the surface of the amplifier medium 2 can be avoided in this way. Moreover, radiating the transformed seed laser radiation 5 into the laser-active amplifier medium 2 in this way brings about a simply designed beam path 2.3 extending rectilinearly through the amplifier medium 2.

The beam path 2.3 of the transformed seed laser radiation 5 through the laser-active amplifier medium 2 runs along a pump channel 2.4. Using a pump process (not illustrated), for example using microwave radiation or a pump laser, energy for amplifying the seed laser radiation is deposited into the regions of the laser-active amplifier medium 2 which lie in the pump channel 2.4. In this case, the energy deposited in the pump channel 2.4 is not distributed uniformly over the entire pump channel 2.4, but rather varies between different regions of the pump channel. Since the amplification of the laser radiation that is achievable using the laser-active amplifier medium 2 is dependent on the amount of energy deposited, the pumped laser-active amplifier medium 2 has a location-dependent gain function. Here, along the transverse directions x, y this gain function respectively follows the gain function profiles 2.1, 2.2 extending transversely with respect to the irradiation direction E.

Figure 2:
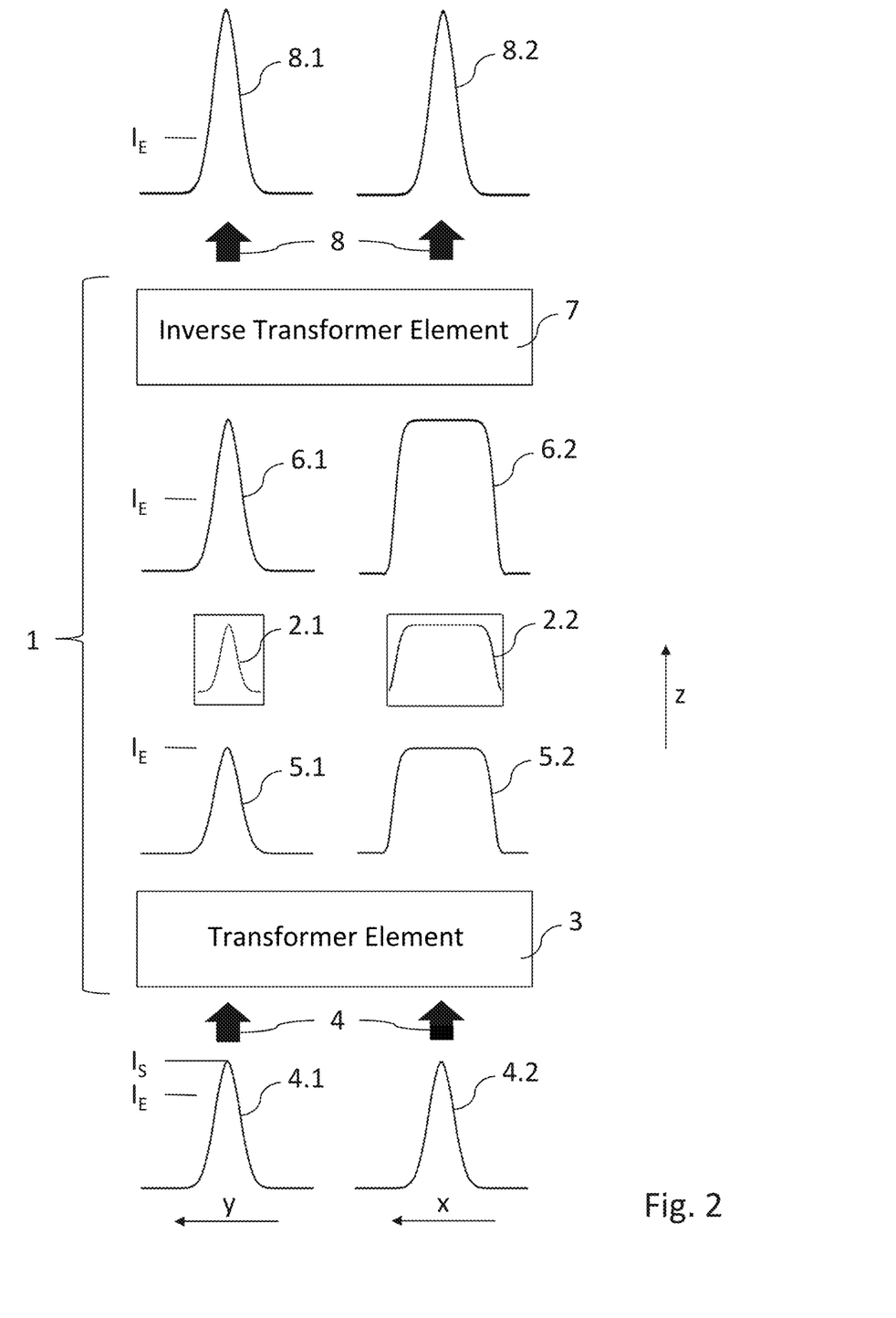
FIG. 2 schematically shows the amplification process with the intensity profiles in both transverse directions.

The input intensity profile 5.1, 5.2 is adapted to these gain function profiles 2.1, 2.2 in order to achieve a high extraction efficiency, i.e. the ratio between laser power of the amplified seed laser radiation 6 that is gained during the amplification and pump power radiated into the amplifier medium 2, as is shown in FIG. 2. In this case, a high spatial overlap between the input intensity profile 5.1, 5.2 and the gain function profile 2.1, 2.2 with, if possible, largely matching profile shapes is sought in order to achieve the highest possible extraction efficiency.

On the opposite side, the now amplified seed laser radiation 6 leaves the amplifier medium and propagates further along the optical axis O. An optical element 15 is disposed downstream in the beam path, which optical element is adapted to the input intensity profile 5.1, 5.2. Using the adaptation, it is possible to achieve the imaging between the amplifier medium 2 and the optical element 15 in a simple manner. The optical elements disposed downstream of the amplifier medium in the beam path can be for example optical isolators counteracting the entrance of backscattering into the amplifier medium, nonlinear crystals for frequency conversion, retardation plates or Pockels cells for polarization rotation and/or for optical switching.

FIG. 2 illustrates the laser intensity profiles during the traversal of the amplifier 1 for the two transverse directions x, y situated next to one another. In this case, the laser radiation propagates from the bottom to the top along the longitudinal direction z in FIG. 2. Before entering the transformer element 3, the seed laser radiation 4 has gaussian seed laser intensity profiles 4.1, 4.2 in both transverse directions x, y. In this case, the source of the seed laser radiation 4 is a laser source which substantially emits laser radiation in the fundamental mode, even though the amplifier is also usable together with other laser sources. Since the seed laser intensity profiles 4.1, 4.2 are the intensity profiles of the same seed laser radiation 4, merely considered along two different transverse directions x, y, the maximum intensity Is at the maximum of both seed laser intensity profiles 4.1, 4.2 is identical.

After the transformation by the transformer element 3, the input intensity profiles 5.1, 5.2 of the transformed seed laser radiation 5 differ from the seed laser intensity profiles 4.1, 4.2. Firstly, the input intensity profiles 5.1, 5.2 have a smaller maximum intensity IE in comparison with the maximum intensity IS. In this case, this reduction of the maximum intensity IE takes place substantially without a power loss since the transformed seed laser radiation 5 is expanded in comparison with the seed laser radiation 4. In this way, the total power of the seed laser radiation 4 can be distributed over a larger range and a reduced power density can thus be achieved. By reducing the power density, it is possible in this case to amplify even seed laser radiations 4 whose power density is so high that radiating the non-transformed seed laser radiation 4 into the amplifier medium 2 would cause disturbing thermal effects or would even result in damage of the amplifier medium 2, in particular on account of the amplification during the propagation through the amplifier medium 2.

In order to achieve the described expansion of the transformed seed laser radiation 5, the latter has an oscillation mode that does not correspond to the fundamental mode of the seed laser radiation 4. This additional oscillation mode brings about an expansion of the transformed seed laser radiation 5 and thus a widening of the input intensity profile 5.2 along the transverse direction x. Along the transverse direction y, this additional oscillation mode has no influence on the input intensity profile 5.1. Besides the reduction of the power density, an adaptation of the input intensity profiles 5.1, 5.2 to the gain function profiles 2.1, 2.2 of the amplifier medium 2 is achieved using the additional oscillation mode.

The seed laser intensity profile 4.2 is transformed into a plateau-shaped input intensity profile 5.2 by the transformer element 3 on the irradiation side. In this case, the input intensity profiles 5.1, 5.2 are adapted with regard to their shape, too, to the gain function profiles 2.1, 2.2 of the laser-active amplifier medium 2 along the respective transverse direction x, y.

In this case, the input intensity profile 5.2 has a substantially rectangular super-gaussian profile. The latter enables the maximum intensity IE to be made available in a constant manner over a wide range extending along the transverse direction x. The input intensity profile 5.2 thus corresponds to the gain function profile 2.2 that is brought about by a pump channel 2.4 which extends substantially rectangularly over the width of the amplifier medium 2 and along which the amplifier medium 2 is pumped uniformly in the transverse direction x.

The input intensity profiles 5.1, 5.2 of the seed laser radiation 5 transformed by the transformer element 3 both have a continuous edge progression without discontinuities or abrupt changes. By virtue of this edge progression, the regions of the transformed seed laser radiation 5 which enter the amplifier medium 2 in the edge regions have comparatively low intensities. Influences of diffraction effects that can occur precisely in the edge regions of the amplifier medium 2 are thereby reduced since only comparatively low intensities are affected by them. Moreover, the continuous edge progression affects the quality of further transformations that possibly take place later, since there are no discontinuities or abrupt changes with the higher oscillation frequencies associated therewith.

Along the second transverse direction y, after the transformation, the shape of the seed laser intensity profile 4.1 continues to be maintained by the input intensity profile 5.1. Just the maximum intensity IS is reduced to the maximum intensity IE. Particularly along the fast axis of the amplifier 1, along which the amplifier medium 2 and the pump channel 4.2 have the smallest transverse extent and along which the laser beam accordingly has the greatest divergence, this affords the advantage that the beam quality is also maintained after the transformation.

During the propagation of the transformed seed laser radiation 5 through the laser-active amplifier medium 2, the energy pumped in the pump channel 4.2, in the region of the overlap between the transformed seed laser radiation 5 and the gain function 2.1, 2.1, is used for amplifying the laser radiation in such a way that amplified seed laser radiation 6 emerges from an exit side of the laser-active amplifier medium 2 along the optical axis of the amplifier 1. The shape of the output intensity profiles 6.1, 6.2 of the amplified seed laser radiation 6 also corresponds to the shape of the input intensity profiles 5.1, 5.2. By contrast, the intensity of the output intensity profiles 6.1, 6.2 has been significantly amplified relative to the input intensity profiles 5.1, 5.2 by the laser-active amplifier medium 2. For illustration purposes, the maximum intensity IE is indicated qualitatively at the output intensity profile 6.1. In this case, the quantitative gain can be in the range of between 2 and 1000 depending on the power of the seed laser radiation 4 and the laser-active amplifier medium 2 used. In this case, large gain factors can be achieved particularly for seed laser radiation 4 of weaker power, while smaller gain factors, e.g. 20, are achieved for seed laser radiation 4 of stronger power, for example 100 W.

The seed laser radiation 6 amplified in this way, with its output intensity profiles 6.1, 6.2, can be used for applications such as laser annealing, for example. Along the transverse direction x, in particular, on account of the plurality of oscillation modes present, the amplified seed laser radiation 6 has a low beam quality with a beam quality factor M2>10. The use of the amplification of the seed laser radiation 6 proves to be advantageous for industrial applications, in particular, for which a linear shape of the laser radiation is more important than the beam quality. Precisely if a homogenization of the radiation has already taken place during the transformation using the transformer element 3, the amplified seed laser radiation 6 can be used for such industrial applications directly without further transformation or homogenization.

The optical elements 15 disposed downstream of the amplifier medium 2, such as, for example, optical isolators, nonlinear crystals, retardation plates or Pockels cells, not illustrated here, are adapted to the input intensity profile 5.1, 5.2 for simplification and for improvement of the imaging. As shown in FIG. 2, the shape of the input intensity profile 5.1, 5.2 also corresponds to the profile shape of the output intensity profile 6.1, 6.2. The inverse transformer element 7 disposed downstream of the amplifier medium is also an optical element adapted in this way.

Using the inverse transformer element 7, which is embodied in the manner of a transformer element 3, the amplified seed laser radiation 6 is transformed into an inverse-transformed seed laser radiation 8. In this case, the output intensity profiles 6.1, 6.2 are converted into the intensity profiles 8.1, 8.2. These intensity profiles 8.1. 8.2 correspond in terms of their shape to the seed laser intensity profiles 4.1, 4.2, but in contrast thereto are amplified in terms of their intensity and power. Besides their intensities, the intensity profiles 4.1, 4.2, 8.1, 8.2 can also differ from one another, given identical shapes, in functional parameters such as, for example, the Gaussian width in the case of Gaussian seed laser radiation 4 and inverse-transformed seed laser radiation 8.

The intensity profiles 8.1, 8.2 are also amplified relative to the output intensity profiles 6.1, 6.2. This is because the inverse-transformed seed laser radiation 8 is focused by the inverse transformation using the inverse transformer element 7 in such a way that the power density of the inverse-transformed seed laser radiation 8 is increased in comparison with the power density of the amplified seed laser radiation 6. Given a substantially uniform total power of the laser radiation upstream and downstream of the inverse transformer element 7, the transverse extent of the inverse-transformed seed laser radiation 8 thus decreases. Particularly if the phase information has been retained during the transformation using the transformer element 3, the seed laser radiation 4 can be effectively amplified in this way such that the inverse-transformed seed laser radiation 8 corresponds to amplified seed laser radiation 4 with the same beam quality. For this purpose, it is possible to use an amplifier medium 2 which would not be usable for a direct amplification of the seed laser radiation 4 since, for example, the power density of the seed laser radiation lies above the destruction threshold of the amplifier medium 2. Alternatively, the inverse-transformed seed laser radiation 8 can also be expanded further using the inverse transformer element 7.

Figure 3:
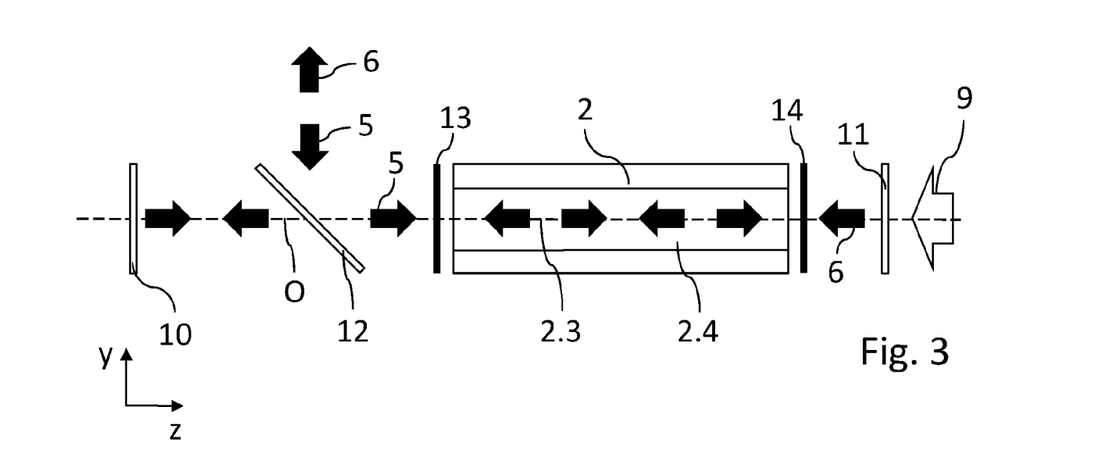
FIG. 3 shows a laser-active amplifier medium through which the transformed seed laser radiation passes multiply.

A further increase in the amplification using the amplifier 1 can be achieved using the arranged shown in FIG. 3. In this case, the seed laser radiation 5 that has already been transformed using the transformer element 3 (not illustrated here) is directed onto the optical axis O via a deflection element 12, which can be a partly transparent mirror, along which optical axis the amplified seed laser radiation 6 can enter the laser-active amplifier medium 2. Before entering the amplifier medium 2, the transformed seed laser radiation 5 passes through an optical element 13 for polarization rotation, such as a retardation plate, in particular a λ/4 plate.

On the opposite side of the amplifier medium 2 with respect to the deflection element 12, the amplified seed laser radiation 6 can leave the amplifier medium 2. There it passes through a further optical element 14 for polarization rotation and is reflected back by a reflector element 11 along the same beam path 2.3 through the optical element 14 and the pump channel 2.4 of the laser-active amplifier medium 2. Upon traversing the pump channel 2.4 along the beam path 2.3 again, the laser radiation can be amplified further. The seed laser radiation 6 amplified in this way emerges from the original irradiation side of the amplifier medium 2 and passes through the optical element 13 again. Using the two optical elements 13, 14 the polarization of the amplified seed laser radiation 6 is then rotated in such a way that it can propagate through the deflection element 12 on the optical axis O, without being diverted.

The amplified seed laser radiation 6 can then either be guided through an output coupling element (not illustrated), for example a Pockels cell, out of the amplifier 1 or be reflected back into the laser-active amplifier medium 2 for amplification again using a second reflector element 10. In the case where the amplified seed laser radiation 6 is reflected back, it is amplified again in the amplifier medium 2 and experiences further phase rotations using the optical elements 13, 14. After two further traversals of the laser-active amplifier medium 2, the amplified seed laser radiation 6, particularly with the use of $\lambda/4$ plates as optical elements 13, 14, can be diverted from the optical axis O via the deflection element 12 and leave the amplifier 1.

Since the transformed seed laser radiation 5, upon repeated traversal of the amplifier medium 2, is always guided along the same beam path 2.3 and amplified in the process, a compact design of the amplifier results despite repeated traversal of the amplifier medium 2. This simultaneously allows the use of the entire part of the amplifier medium 2 that is situated in the pump channel 2.4 for amplification upon each pass of the laser radiation through the amplifier medium 2. Traversal of the pump channel 2.4 of the amplifier medium 2 up to four times has proved to be advantageous here.

FIG. 3 additionally shows a method for pumping the laser-active amplifier medium 2. In this case, a pump laser beam 9 is radiated into the amplifier medium 2 along the same direction as the transformed seed laser radiation 5. A diode laser bar can serve as a source of the pump laser beam 9, in which diode laser bar a plurality of laser diodes are arranged linearly next to one another along the x-direction. In this case, the laser radiation of these individual diodes is superimposed to form the pump laser beam 9. The latter has a smaller extent along the transverse y-direction in comparison with the transverse x-direction and is substantially linear in this respect. Using the pump laser beam 9 radiated in, an energy is deposited in the pump channel 2.4 of the amplifier medium 2, which energy is used partly for amplifying the transformed seed laser radiation 5 depending on the extraction efficiency achieved. Preferably, the pumping using the pump laser beam 9 is effected in such a way that before every propagation of the transformed seed laser radiation 5 or of the amplified seed laser radiation 6 through the laser-active amplifier medium 2, the laser-active amplifier medium 2 situated in the pump channel 2.4 is pumped. Energies that have possibly already been drawn from the amplifier medium 2 for amplification purposes are tracked in this case. The intensity profile (not illustrated) of the pump laser beam 9 preferably corresponds to the input intensity profile 5.1, 5.2. In this case, a pump laser beam 9 having such an intensity profile deposits energy in the laser-active amplifier medium 2 in such a way that the gain function profiles 2.1, 2.2 thereof correspond to the profile shape of the pump laser beam 9 and thus to the profile shapes of the input intensity profiles 5.1, 5.2. An adaptation of the input intensity profiles 5.1, 5.2 to the amplifier function profiles 2.1, 2.2 thus results in a simple constructive way. In order to enable the pump laser beam 9 to be radiated into the laser-active amplifier medium 2, the reflector element 11 in the set-up illustrated in FIG. 3 is at least partly transparent, in particular wholly transparent, at least to the wavelength range of the pump laser beam 9.

Figure 4:
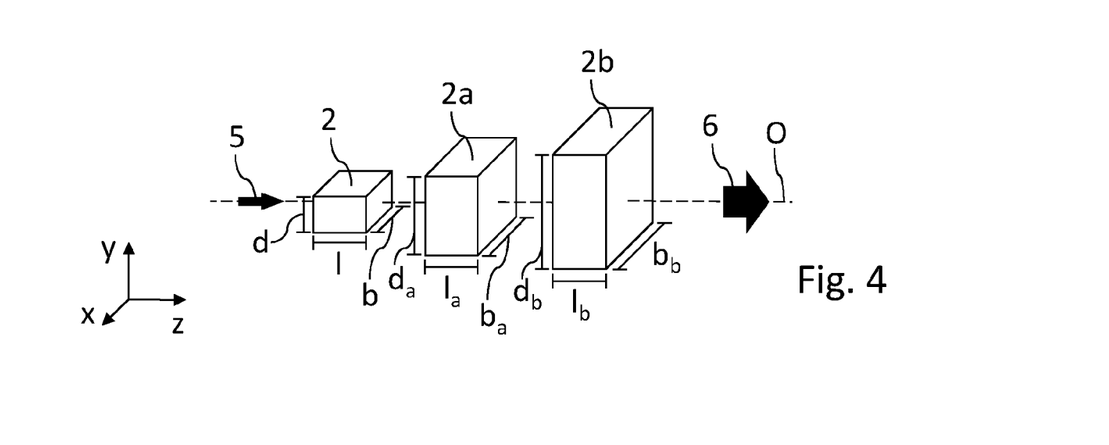
FIG. 4 shows amplifier media arranged in the manner of cascaded amplifier stages.

In order to enable a further amplification, alternatively or additionally it is also possible to use the arrangement— illustrated schematically in FIG. 4—of a plurality of amplifier media 2, 2a, 2b as cascaded amplifier stages. The seed laser radiation 5 that has already been transformed by the transformer element 3 is firstly radiated into the amplifier medium 2 along the optical axis O. During propagation through the amplifier medium, the transformed seed laser radiation 5 is amplified and emerges from the laser-active amplifier medium 2 on the opposite side. Following that, it enters a second laser-active amplifier medium 2a and is amplified further by the latter. Following the second amplifier medium 2a, the laser radiation is amplified further using the third laser-active amplifier medium 2b and emerges as seed laser radiation 6 that has been amplified using these three stages. The distances between the amplifier media 2, 2a, 2b along the optical axis O that are illustrated here serve substantially for better illustration. The distances can be omitted in a technical implementation of amplifier stages cascaded in this way. One or more optical elements can likewise be arranged between the individual amplifier media 2, 2a, 2b. The optical elements can be for example lenses, aspheres, acylindrical lenses, diffractive elements, mirrors, total internal reflection mixing elements and/or apertures for imaging the laser radiation emerging from an amplifier medium 2, 2a onto a following amplifier medium 2a, 2b or optical isolators, nonlinear crystals, retardation plates and/or Pockels cells for influencing the transmission behavior of the amplifier 1.

The individual amplifier media 2, 2a, 2b can be chosen differently in an application-related manner. In this case, they can differ with regard to the material used and/or their dimensions, in particular in terms of their lengths 1, 1a, 1b, widths b, ba, bb and/or thicknesses d, da, db. In this case, the number of amplifier media 2 embodied as cascaded amplifier stages is not restricted to the three amplifier media 2, 2a, 2b illustrated. It is also possible for more or fewer amplifier media 2, 2a, 2b to be arranged in a manner cascaded with one another. In this case, amplifier media 2 of different transverse thickness d enable an adaptation of the cascaded amplifier stages to the divergence of the transformed seed laser radiation 5, which occurs in particular along the fast axis running in the direction y and leads to a widening of the radiation during propagation. In this case, amplifier media 2b situated further downstream in the beam path of the amplifier 1 along the optical axis O preferably have a greater thickness db than amplifier media 2, 2a situated further upstream in the beam path and having the thickness d, da. This is also discernible in FIG. 4 since the thickness d of the amplifier medium 2 is less than the thickness da of the second amplifier medium 2a, which is in turn less than the thickness db of the third amplifier medium 2b.

In order to take account of these different thicknesses d, da, db of the amplifier media 2, 2a, 2b and also the pump channels 2.4 of the respective amplifier media 2, which pump channels should likewise be chosen to be wider for divergent transformed seed laser radiation 5, in the case of an arrangement of a plurality of amplifier media 2 in the manner of cascaded amplifier stages it has proved to be advantageous if a dedicated pump laser beam 9 is assigned to each amplifier stage. The pump laser beam 9 deposits energy along the transverse direction x and thus transversely with respect to the optical axis O in the respective amplifier media 2. Influencing of one amplifier medium 2 by a pump laser beam 9 associated with another amplifier medium 2 is thus prevented in a simple manner.

A further adaptation of the transverse dimensions of the cascaded amplifier stages can be effected on the basis of the transverse width b of the individual amplifier media 2. Unlike an adaptation of the thickness d of the amplifier medium 2, an adaptation of the width b primarily does not serve for compensating for the divergence of the transformed seed laser radiation 5, but rather for an adaptation to the power of the laser radiation radiated into the amplifier medium 2. In this regard, an amplifier medium having a smaller transverse width b can be provided for the amplification of seed laser radiation 4 of comparatively weak power. By contrast, an amplifier medium 2 having a large transverse width can be provided for the amplification of seed laser radiation 4 of strong power. In this way, for low-power seed laser radiations 4 an amplification that is cost-effective since it requires only a small amplifier medium can be effected, while for seed laser radiation 4 of strong power a comparatively wide amplifier medium 2 can be used, which can amplify transformed seed laser radiation 5 that has been expanded to a greater extent, in the case of which, despite seed laser radiation 4 of strong power, a power density lying below the destruction threshold of the amplifier medium 2 can be achieved as a result of the widening during the transformation. In this case, the amplifier 1 can be constructed modularly in such a way that the amplifier medium 2 respectively used can be exchanged depending on the total power of the seed laser radiation 4, without the other components of the amplifier 1 being influenced thereby.

As illustrated in FIG. 4, a combination of a plurality of amplifier media 2 disposed one behind another in the manner of cascaded amplifier stages and having different thicknesses d for compensating for the divergence and/or having different widths b for adaptation to the power density of the laser radiation that respectively enters the amplifier media 2, 2a, 2b and has been amplified by the preceding amplifier medium 2, 2a, 2b is also possible.

With the aid of the above-described method and the amplifier 1, it is possible to amplify seed laser radiation more efficiently.

What is claimed is:

1. A method, comprising:
amplifying seed laser radiation that is radiated into a laser-active amplifier medium along an irradiation direction,
wherein the seed laser radiation has a transverse seed laser intensity profile that is transformed into a plateau-shaped input intensity profile by a transformer element on the irradiation side,
wherein the input intensity profile maintains the shape of the seed laser intensity profile along a transverse direction of the seed laser radiation, and wherein the transverse direction is along a fast axis.

2. The method as claimed in claim 1, wherein the input intensity profile is adapted to a gain function profile of the amplifier medium that extends transversely with respect to the irradiation direction.

3. The method as claimed in claim 1, wherein the seed laser intensity profile is in the shape of a bell curve.

4. The method as claimed in claim 1, wherein the transformed seed laser radiation has an oscillation mode different from the fundamental mode of the seed laser radiation.

5. The method as claimed in claim 1, wherein-the maximum intensity of the input intensity profile is less than the maximum intensity of the seed laser intensity profile.

6. The method as claimed in claim 1, wherein-the amplifier medium for amplifying the seed laser radiation is cuboidal.

7. The method as claimed in claim 1, wherein the seed laser radiation is radiated into the amplifier medium substantially parallel to a surface normal to a side surface of the amplifier medium parallel to an optical axis of the amplifier.

8. The method as claimed in claim 1, wherein the transformed seed laser radiation passes multiply through the amplifier medium along the same beam path through the amplifier medium.

9. The method as claimed in claim 1, wherein optical elements selected from the group consisting of lenses, aspheres, acylindrical lenses, diffractive elements, mirrors, total internal reflection mixing elements and apertures, are used in the transformer element.

10. The method as claimed in claim 1, wherein optical elements disposed downstream of the amplifier medium in the beam path are adapted to the input intensity profile.

11. The method as claimed in claim 1, wherein an inverse transformer element inverse-transforms the output intensity profile of the amplified seed laser radiation is inverse-transformed in the manner of a transformer element into an intensity profile that is similar to the seed laser intensity profile.

12. The method as claimed in claim 1, wherein the amplifier medium is pumped by a pump laser beam, the intensity profile of which corresponds to the input intensity profile.

13. The method as claimed in claim 1, wherein a plurality of amplifier media are disposed one behind another along the beam path in the manner of cascaded amplifier stages.

14. The method as claimed in claim 1, wherein a transverse width of the amplifier medium is chosen in a power-dependent manner.

15. An amplifier for amplifying seed laser radiation that is radiated into a laser-active amplifier medium along an irradiation direction, the amplifier comprising:
one or more elements comprising the laser-active amplifier medium,
wherein the seed laser radiation has a transverse seed laser intensity profile that is transformed into a plateau-shaped input intensity profile by a transformer element on the irradiation side,
wherein the input intensity profile maintains the shape of the seed laser intensity profile along a transverse direction of the seed laser radiation, and wherein the transverse direction is along a fast axis.

16. A method comprising:
amplifying seed laser radiation that is radiated into a laser-active amplifier medium along an irradiation direction,
wherein the seed laser radiation has a transverse seed laser intensity profile that is transformed into a plateau-shaped input intensity profile by a transformer element on the irradiation side,
wherein an inverse transformer element inverse-transforms the output intensity profile of the amplified seed laser radiation in the manner of a transformer element into an intensity profile that is similar to the seed laser intensity profile.

\* \* \* \* \*